US012051381B2

(12) United States Patent
Tsai et al.

(10) Patent No.: US 12,051,381 B2
(45) Date of Patent: Jul. 30, 2024

(54) DISPLAY DRIVER AND CONTROL METHOD THEREOF

(71) Applicant: Novatek Microelectronics Corp., Hsinchu (TW)

(72) Inventors: Yi-Yang Tsai, Hsinchu County (TW); Hung-Ho Huang, Hsinchu (TW); Tzong-Honge Shieh, Hsinchu County (TW); Chieh-An Lin, Taipei (TW); Po-Hsiang Fang, Hsinchu County (TW); Jhih-Siou Cheng, New Taipei (TW)

(73) Assignee: Novatek Microelectronics Corp., Hsinchu (TW)

( * ) Notice: Subject to any disclaimer, the term of this patent is extended or adjusted under 35 U.S.C. 154(b) by 0 days.

(21) Appl. No.: 18/167,896

(22) Filed: Feb. 13, 2023

(65) Prior Publication Data

US 2024/0096289 A1 Mar. 21, 2024

Related U.S. Application Data

(60) Provisional application No. 63/408,813, filed on Sep. 21, 2022.

(51) Int. Cl.
*G09G 3/34* (2006.01)

(52) U.S. Cl.
CPC ... *G09G 3/3406* (2013.01); *G09G 2310/0237* (2013.01); *G09G 2320/0261* (2013.01); *G09G 2320/064* (2013.01); *G09G 2330/021* (2013.01); *G09G 2370/00* (2013.01)

(58) Field of Classification Search
CPC .............. G09G 2310/0237; G09G 3/3406
See application file for complete search history.

(56) References Cited

U.S. PATENT DOCUMENTS

| 6,208,319 B1 * | 3/2001 | Nishida | G09G 3/2088 345/1.3 |
| 2010/0074175 A1 * | 3/2010 | Banks | H04W 52/0209 370/312 |
| 2012/0162289 A1 * | 6/2012 | Oniki | G09G 3/342 345/102 |
| 2016/0335957 A1 * | 11/2016 | Fu | G09G 3/3426 |
| 2020/0081859 A1 * | 3/2020 | Mishra | G06F 13/385 |
| 2021/0081159 A1 * | 3/2021 | Kaneko | G06F 3/1446 |
| 2021/0335286 A1 * | 10/2021 | Cui | G09G 3/3614 |
| 2021/0365230 A1 * | 11/2021 | Sul | G06F 3/1431 |

* cited by examiner

*Primary Examiner* — William Boddie
*Assistant Examiner* — Bipin Gyawali
(74) *Attorney, Agent, or Firm* — JCIPRNET

(57) ABSTRACT

The disclosure provides a control method of a display driver. The control method includes receiving address information and defining an IC address according to the address information. The IC address includes n bits representing k zones, and n and k are positive integers. The control method further includes receiving the IC address, a black frame data signal and a pulse-width modulation (PWM) signal, and turning on or off the plurality of LEDs in the corresponding zone according to toggle of bit in the black frame data signal. Each bit in the black frame data signal indicates that a plurality of LEDs in a zone among the k zones are turned on or off.

10 Claims, 3 Drawing Sheets

DISPLAY DRIVER AND CONTROL METHOD THEREOF

CROSS-REFERENCE TO RELATED APPLICATION

This application claims the priority benefit of U.S. provisional application Ser. No. 63/408,813, filed on Sep. 21, 2022. The entirety of the above-mentioned patent application is hereby incorporated by reference herein and made a part of this specification.

BACKGROUND

Technical Field

The disclosure relates to a LED technology, and more particularly to a display driver and a control method thereof for demotion blur.

Description of Related Art

Traditional liquid crystal display (LCD) TVs, in order to solve the problem of inadequately fast response speed of liquid crystal flipping dynamic image, are often equipped with motion blur reduction function, which uses black frame insertion technology to insert extra black frames between output images, so as to achieve the effect (e.g., high motion definition) of traditional cathode ray tube (CRT).

However, the traditional motion blur reduction function is implemented by a high cost and power consumption control circuit, which includes a large number of counters and storage space, controls the frequency and interval of black frame insertion in the backlight area, and cooperates with external synchronization signals to avoid screen delay, tearing, and stuttering.

Accordingly, how to design a display driver and a control method thereof that may reduce the disadvantages of LCD motion blur to improve the performance of dynamic images while maintaining low cost and power consumption is one of the technical subjects studied by those skilled in the art.

Note here that the content in the section of "Description of Related Art" is used to help understand the present disclosure. Part of the content (or all of the content) disclosed in the section of "Description of Related Art" may not be the conventional technology known to those with ordinary knowledge in the art. The content disclosed in the section of "Description of Related Art" does not mean that the content has been known to those with ordinary knowledge in the art before the application of the present disclosure.

SUMMARY

The disclosure provides a display driver and a control method thereof, which may control to turn on or off the LEDs by group delaying the pulse of the pulse-width modulation (PWM) signal through a simple control circuit with a demotion function, so as to reduce the motion blur with low cost and power consumption.

In an embodiment of the present disclosure, a control method of a display driver includes receiving address information and defining an IC address according to the address information. The IC address includes n bits representing k zones, and n and k are positive integers. The control method further includes receiving the IC address, a black frame data signal and a pulse-width modulation (PWM) signal, and turning on or off the plurality of LEDs in the corresponding zone according to toggle of bit in the black frame data signal. Each bit in the black frame data signal indicates that a plurality of LEDs in a zone among the k zones are turned on or off.

In an embodiment of the disclosure, a display driver includes a serial receiver, a multi drop receiver, and a control circuit. The serial receiver receives address information and defines an IC address according to the address information. The IC address includes n bits representing k zones, and n and k are positive integers. The multi drop receiver receives a black frame data signal. Each bit in the black frame data signal indicates that a plurality of LEDs in a zone among the k zones are turned on or off. The control circuit receives the IC address from the serial receiver and the black frame data signal from the multi drop receiver.

Based on the above, a display driver and a control method thereof of the disclosure use a serial receiver to define an address (that is, an IC address including n bits representing k zones) of a display driver in a serial path, and use a multi drop receiver to receive system settings such as a black frame data signal where each bit sets a plurality of LEDs in the corresponding zone to turn on or off. The display driver and the control method thereof of the disclosure mainly use a control circuit to control the opening and closing of the pulse of the PWM signal (that is, turning on or off the plurality of LEDs in the corresponding zone) according to toggle of bit in the black frame data signal. In this way, only a simple control circuit may achieve the effect of inserting black frames at staggered positions and realize the function of reducing movement afterimages in a low-cost and low-power consumption manner.

In order to make the aforementioned features and advantages of the disclosure more comprehensible, embodiments accompanied with drawings are described in detail below.

DESCRIPTION OF THE EMBODIMENTS

Figure 1:
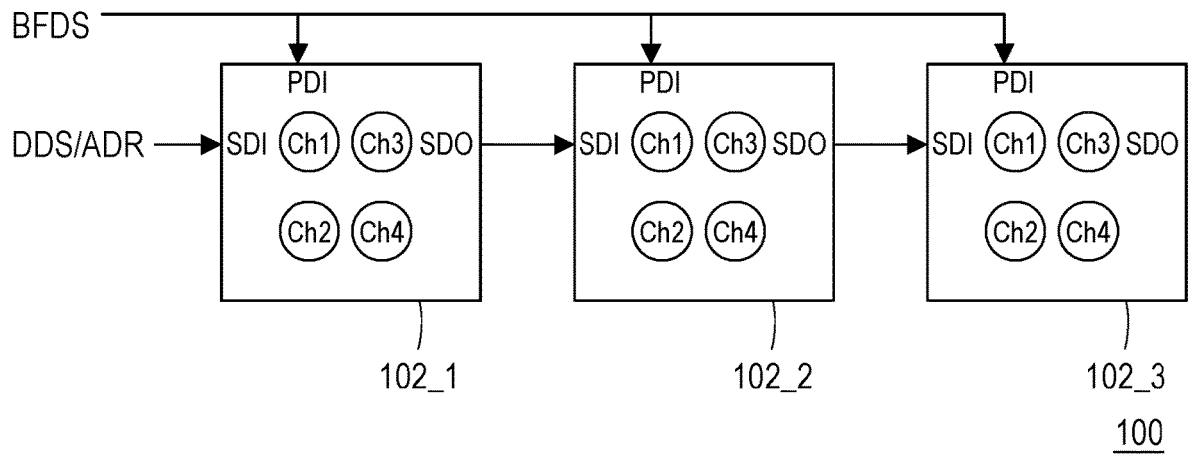
FIG. 1 is a schematic diagram illustrating a LED backlight driving system according to an embodiment of the present disclosure.

The term "coupling (or connection)" used in the full text of the present application (including the scope of the claims) may refer to any direct or indirect connection. For example, if the text describes that the first device is coupled (or connected) to the second device, it should be interpreted as that the first device is directly connected to the second device, or that the first device is indirectly connected to the second device through other devices or some other connection. The terms "first" and "second" mentioned in the full text of the description of the present application (including the scope of the claims) are used to name the element, or to distinguish between different embodiments or ranges, but are not used to limit the upper or lower limit of the number of elements or the order of components. In addition, wherever possible, elements/components/steps with the same reference numbers in the drawings and embodiments represent the same or similar parts. The descriptions of the elements/components/steps that use the same reference numerals or the same terms in different embodiments may be the mutual references of one another.

FIG. 1 is a schematic diagram illustrating a LED backlight driving system 100 according to an embodiment of the present disclosure. In the embodiment illustrated in FIG. 1, the LED backlight driving system 100 may include a plurality of driver integrated circuits (ICs) 102_1-102_3 connected to each other in series. In the present embodiment, the plurality of display drivers 102_1-102_3 may be controlled by system settings such as a black frame data signal BFDS through a multi-drop bus, and each of the display drivers 102_1-102_3 may drive the LEDs through one of channels Ch1-Ch4. In the present embodiment, three display drivers 102_1-102_3 and four channels Ch1-Ch4 are illustrated, but the present disclosure is not necessarily restricted thereto.

Specifically, each of the display drivers 102_1-102_3 may include an input port PDI that receives the black frame data signal BFDS. In an embodiment, these display drivers 102_1-102_3 may be further equipped with a daisy chain input port SDI and output port SDO for receiving a display data signal DDS and address information ADR and transmitting the display data signal DDS and the address information ADR to the next display driver.

Figure 2:
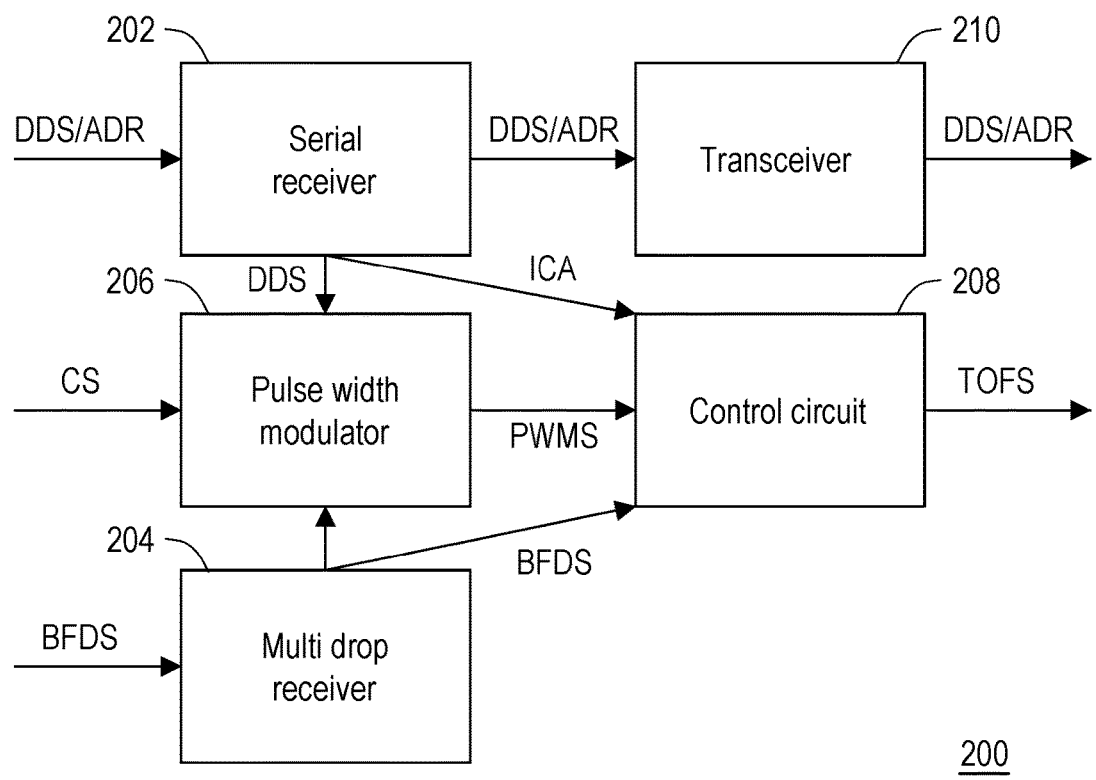
FIG. 2 is a schematic block diagram illustrating any one of the display drivers 102_1-102_3 depicted in FIG. 1 according to an embodiment of the present disclosure.

FIG. 2 is a schematic block diagram illustrating any one of the display drivers 102_1-102_3 depicted in FIG. 1 according to an embodiment of the present disclosure. In the embodiment illustrated in FIG. 2, the display driver 200 includes a serial receiver 202, a multi drop receiver 204, a pulse width modulator (PWM) 206, a control circuit 208 and a transceiver 210. The PWM 206 is coupled to the serial receiver 202 and the multi drop receiver 204. The control circuit 208 is coupled to the serial receiver 202, the multi drop receiver 204 and the PWM 206. The transceiver 210 is coupled to the serial receiver 202.

With reference to FIG. 2, the serial receiver 202 may receive the display data signal DDS and the address information ADR. Next, the serial receiver 202 may define an IC address ICA according to the address information ADR. Particularly, the IC address ICA includes n bits representing k zones. In an embodiment, n and k are positive integers. In an embodiment, k is equal to 2 to the power of n.

The multi drop receiver 204 may receive the black frame data signal BFDS. Specifically, each bit in the black frame data signal BFDS indicates that a plurality of LEDs in a zone among k zones are turned on or off. In an embodiment, a bit number of the black frame data signal BFDS is equal to k.

The control circuit 208 may receive the IC address ICA from the serial receiver 202, the black frame data signal BFDS from the multi drop receiver 204, and the PWM signal PWMS from the PWM 206. The control circuit 208 may output a control signal TOFS to turn on or off the plurality of LEDs in the corresponding zone according to toggle of bit in the black frame data signal BFDS.

Here, by the way, the PWM 206 may receive the display data signal DDS from the serial receiver 202 and a clock signal CS from outside and then generate the PWM signal PWMS according to the display data signal DDS and the clock signal CS. In an embodiment, the PWM 206 may further receive some parameter signals from the multi drop receiver 204. The transceiver 210 may receive the display data signal DDS and the address information ADR from the serial receiver 202 and transmit the display data signal DDS and the address information ADR to the serial receiver of next display driver.

Figure 3:
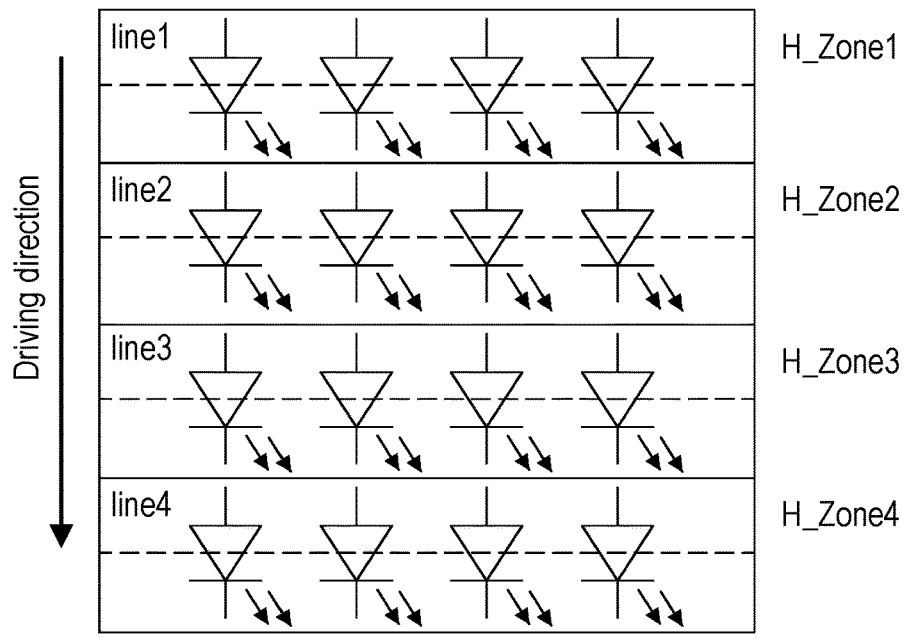
FIG. 3 is a schematic diagram illustrating all LEDs controlled by the LED backlight driving system according to an embodiment of the present disclosure.
Figure 4:
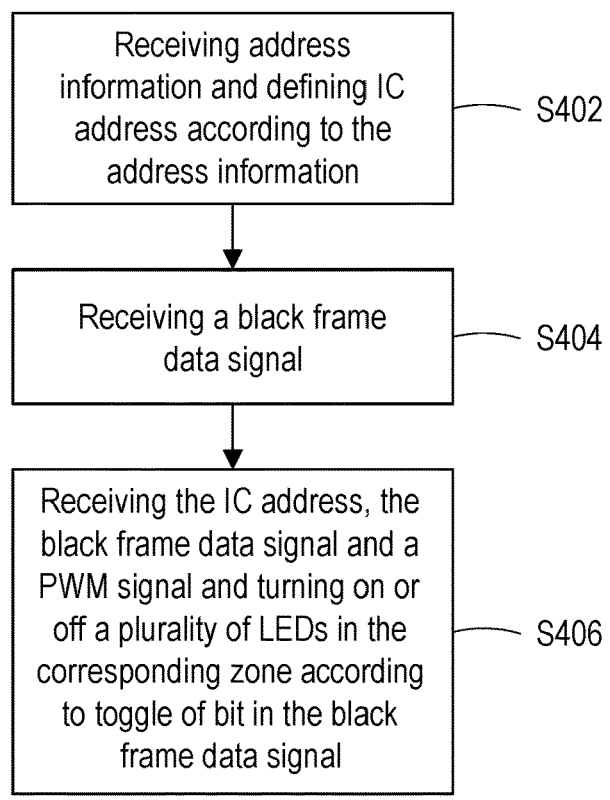
FIG. 4 is a flow chart illustrating steps of a control method according to an embodiment of the present disclosure.

The operation example of the above circuit structure will be further illustrated with the LED zones depicted in FIG. 3 and the control method depicted in FIG. 4.

FIG. 3 is a schematic diagram illustrating all LEDs controlled by the LED backlight driving system 100 according to an embodiment of the present disclosure. In the embodiment illustrated in FIG. 3, the LEDs are divided into four zones H_Zone1-H_Zone4 according to driving area of the LED backlight driving system 100. The driving direction is sequentially from line1 (H_Zone1) to line4 (H_Zone4) or from line4 (H_Zone4) to line1 (H_Zone1), and the present disclosure is not limited thereto. Each zone may be controlled by one channel of the same display driver or the different display drivers. In the present embodiment, four zones H_Zone1-H_Zone4 are illustrated, but the present disclosure is not necessarily restricted thereto.

Combined with FIGS. 2 and 3 for illustration, for instance n is two and k is four. That is to say, the IC address ICA includes two bits representing four zones H_Zone1-H_Zone4. The bit number of the black frame data signal BFDS is equal to four. In detail, the zero bit in the black frame data signal BFDS indicates that LEDs in the first zone H_Zone1 are turned on or off. The first bit in the black frame data signal BFDS indicates that LEDs in the second zone H_Zone2 are turned on or off. The second bit in the black frame data signal BFDS indicates that LEDs in the third zone H_Zone3 are turned on or off. The third bit in the black frame data signal BFDS indicates that LEDs in the fourth zone H_Zone4 are turned on or off.

Specifically, the serial receiver 202 receives the address information ADR and defines the IC address ICA, for example assuming ICA[1:0]=1. The multi drop receiver 204 receives the black frame data signal BFDS[3:0]. The control circuit 206 receives the IC address ICA[1:0] and the black frame data signal BFDS[3:0], and then turns on or off the plurality of LEDs in the second zone H_Zone2 according to the toggle of the first bit in the black frame data signal BFDS[3:0] which is determined by the IC address ICA[1:0] (that is, ICA[1:0]=1). For example, assuming BFDS[3:0]= xx1x means that the plurality of LEDs in the second zone H_Zone2 are turned off after this time until the multi drop receiver 204 of the display driver 200 receives BFDS[3:0]= xx0x. However, another example, conversely, assuming BFDS[3:0]=xx0x means that the plurality of LEDs in the second zone H_Zone2 are turned off after this time until the multi drop receiver 204 of the display driver 200 receives BFDS[3:0]=xx1x.

In this way, the delay data register (usually 16 bits) required by each channel can be reduced, and the frame counter of the delay generated by each channel can be also reduced to achieve the advantages of reducing power consumption and area.

FIG. 4 is a flow chart illustrating steps of a control method according to an embodiment of the present disclosure. In the embodiment illustrated in FIG. 4, the control method 400 is applicable to the display driver 200 of FIG. 2, and the detailed steps of the control method 400 of this embodiment will be described below with various components in the display driver 200.

In step S402, the serial receiver 202 receives address information ADR and defines IC address ICA according to the address information ADR. The IC address ICA includes n bits representing k zones. In particular, n and k are positive integers, and k is equal to 2 to the power of n. Take FIG. 3 as an example, n is two and k is four. Therefore, the serial receiver 202 defines IC address ICA as ICA[1:0] in this example.

In step S404, the multi drop receiver 204 receives a black frame data signal BFDS. Especially, the multi drop receiver 204 receives the black frame data signal BFDS including four bits, namely BFDS[3:0].

In step S406, the control circuit 208 receives the IC address ICA from the serial receiver 202, the black frame data signal BFDS from the multi drop receiver 204 and a PWM signal PWMS from the PWM 206, and turns on or off the plurality of LEDs in the corresponding zone according to toggle of bit in the black frame data signal BFDS. In detail, after the control circuit 208 receives the IC address ICA[1:0] and the black frame data signal BFDS[3:0], the control circuit 208 controls whether to output the PWM signal PWMS as the control signal TOFS to turn on the plurality of LEDs in the corresponding zone according to the toggle of bit in the black frame data signal BFDS. More specifically, if the value of ICA[1:0] is m, this means whether to output the PWM signal PWMS is controlled by the m bit of BFDS[3:0].

In an embodiment, when the plurality of LEDs in the corresponding zone are turned on and the toggle of the bit in the black frame data signal BFDS occurs, the control circuit 208 turns off the plurality of LEDs in the corresponding zone. In an embodiment, when the plurality of LEDs in the corresponding zone are turned off and the toggle of the bit in the black frame data signal BFDS occurs, the control circuit 208 turns on the plurality of LEDs in the corresponding zone. Please refer to FIG. 5 for further explanation of this part. In addition, when the plurality of LEDs in the corresponding zone are turned on, the control circuit 208 controls the brightness of the plurality of LEDs by the PWM signal PWMS.

Figure 5:
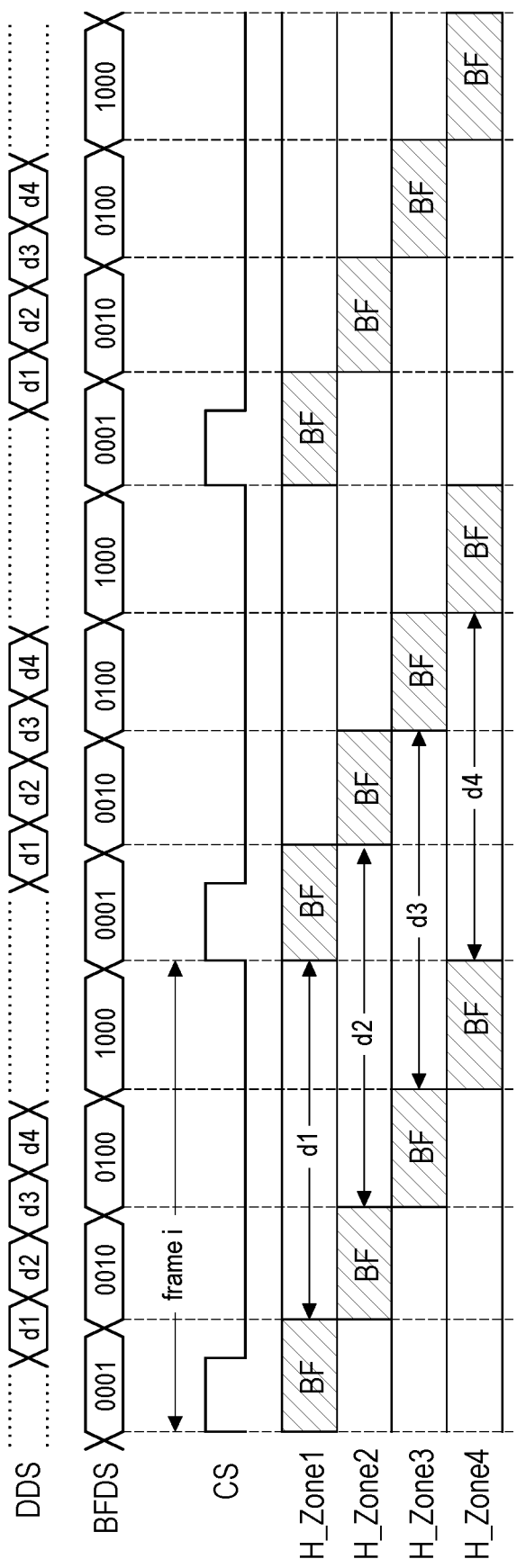
FIG. 5 is timing diagram illustrating example operation of the display driver using the control method according to an embodiment of the present disclosure.

FIG. 5 is timing diagram illustrating example operation of the display driver 200 using the control method according to an embodiment of the present disclosure. In the embodiment illustrated in FIG. 5, it shows the operation of four zones H_Zone1-H_Zone4 as an example. In an embodiment, FIG. 3 shows one arrangement of zones H_Zone1-H_Zone4, and the present disclosure is not limited thereto.

FIG. 5 shows the operation of the control circuit 208 to turn on the plurality of LEDs in the zone among zones H_Zone1-H_Zone4 sequentially in a clock cycle of the clock signal CS. For example, in frame i, the serial receiver 202 receives the display data signal DDS including data d1-d4, and the multi drop receiver 204 receives the black frame data signal BFDS including four bits, namely BFDS[3:0]. When the zero bit of BFDS[3:0] is 1, the control circuit 206 does not output the PWM signal PWMS and inserts a black frame BF to turn off the plurality of LEDs in the zone H_Zone1. Then the zero bit of BFDS[3:0] is toggled from 1 to 0, and the first bit of BFDS[3:0] is toggled from 0 to 1. The control circuit 208 outputs the PWM signal PWMS to turn on the plurality of LEDs in the zone H_Zone1 and does not output the PWM signal PWMS and inserts the black frame BF to turn off the plurality of LEDs in the zone H_Zone2. The operation of the zones H_Zone3 and H_Zone4 refers to the above and so on and will not be repeated here.

In an embodiment, when the zero bit of BFDS[3:0] is 0, the control circuit 208 does not output the PWM signal PWMS and inserts the black frame BF to turn off the plurality of LEDs in the zone H_Zone1. When the zero bit of BFDS[3:0] is 1, the control circuit 208 outputs the PWM signal PWMS to turn on the plurality of LEDs in the zone H_Zone1.

In the embodiment of the disclosure, the multi-drop bus is used to control the display driver channel to delay the insertion of a black frame to reduce the movement afterimages. Using the control method in FIG. 4, the black frame data signal BFDS is used to control whether to output the PWM signal PWMS to turn on or off the plurality of LEDs in the corresponding zone to achieve the function of inserting a black frame.

In summary, a display driver and a control method thereof of the disclosure use a serial receiver to define an address (that is, an IC address including n bits representing k zones) of a display driver in a serial path, and use a multi drop receiver to receive system settings such as a black frame data signal where each bit sets a plurality of LEDs in the corresponding zone to turn on or off. The display driver and the control method thereof of the disclosure mainly use a control circuit to control the opening and closing of the pulse of the PWM signal (that is, turning on or off the plurality of LEDs in the corresponding zone) according to toggle of bit in the black frame data signal. In this way, only a simple control circuit may achieve the effect of inserting black frames at staggered positions and realize the function of reducing movement afterimages in a low-cost and low-power consumption manner.

Although the disclosure has been disclosed by the above embodiments, they are not intterminaled to limit the disclosure. To any one of ordinary skill in the art, modifications and embellishment to the disclosed embodiments may be made without departing from the spirit and the scope of the disclosure. Accordingly, the scope of the disclosure is defined by the claims attached below and their equivalents.

What is claimed is:
1. A control method of a display driver, comprising:
receiving address information and defining an IC address according to the address information, wherein the IC address includes n bits representing k zones, and n and k are positive integers,
receiving the IC address, a black frame data signal and a pulse-width modulation (PWM) signal, wherein each bit in the black frame data signal indicates that a plurality of LEDs in a zone among the k zones are turned on or off, wherein k is equal to 2 to the power of n, and a bit number of the black frame data signal is equal to k; and
turning on or off the plurality of LEDs in the corresponding zone according to toggle of bit in the black frame data signal.
2. The control method of the display driver according to claim 1, wherein the step of turning on or off the plurality of LEDs in the corresponding zone comprising:
when the plurality of LEDs in the corresponding zone are turned on and the toggle of the bit in the black frame data signal occurs, turning off the plurality of LEDs in the corresponding zone; and
when the plurality of LEDs in the corresponding zone are turned off and the toggle of the bit in the black frame data signal occurs, turning on the plurality of LEDs in the corresponding zone.
3. The control method of the display driver according to claim 1, further comprising:
when the plurality of LEDs in the corresponding zone are turned on, controlling the brightness of the plurality of LEDs by the PWM signal.

4. The control method of the display driver according to claim 1, further comprising:
   receiving a display data signal and a clock signal; and
   generating the PWM signal according to the display data signal and the clock signal.

5. The control method of the display driver according to claim 4, further comprising:
   turning on the plurality of LEDs in the zone among the k zones sequentially in a clock cycle of the clock signal.

6. A display driver, comprising:
   a serial receiver to receive address information and define an IC address according to the address information, wherein the IC address includes n bits representing k zones, and n and k are positive integers;
   a multi drop receiver to receive a black frame data signal, wherein each bit in the black frame data signal indicates that a plurality of LEDs in a zone among the k zones are turned on or off, wherein k is equal to 2 to the power of n, and a bit number of the black frame data signal is equal to k; and
   a control circuit to receive the IC address from the serial receiver and the black frame data signal from the multi drop receiver.

7. The display driver according to claim 6, wherein when the plurality of LEDs in the corresponding zone are turned on and toggle of the bit in the black frame data signal occurs, the control circuit turns off the plurality of LEDs in the corresponding zone, and when the plurality of LEDs in the corresponding zone are turned off and the toggle of the bit in the black frame data signal occurs, the control circuit turns on the plurality of LEDs in the corresponding zone.

8. The display driver according to claim 6, wherein when the plurality of LEDs in the corresponding zone are turned on, the control circuit is further configured to control the brightness of the plurality of LEDs by a pulse width modulation (PWM) signal.

9. The display driver according to claim 6, wherein the serial receiver is further configured to receive a display data signal, and the display driver is further comprising:
   a transceiver, configured to be coupled to the serial receiver and receive and transmit the display data signal and the address information to next serial receiver;
   a pulse width modulator, configured to be coupled to the serial receiver and the control circuit, receive the display data signal and a clock signal, and generate a pulse width modulation (PWM) signal according to the display data signal and the clock signal.

10. The display driver according to claim 9, wherein the control circuit is further configured to turn on the plurality of LEDs in the zone among the k zones sequentially in a clock cycle of the clock signal.

* * * * *